(12) United States Patent
Matsuda et al.

(10) Patent No.: US 11,472,128 B2
(45) Date of Patent: Oct. 18, 2022

(54) MANUFACTURING METHOD OF RESIN FRAME

(71) Applicants: YKK Corporation, Tokyo (JP); YKK AP INC., Tokyo (JP)

(72) Inventors: Koji Matsuda, Kurobe (JP); Masuo Yamaji, Tokyo (JP)

(73) Assignee: YKK AP INC., Tokyo (JP)

( * ) Notice: Subject to any disclaimer, the term of this patent is extended or adjusted under 35 U.S.C. 154(b) by 267 days.

(21) Appl. No.: 16/445,989

(22) Filed: Jun. 19, 2019

(65) Prior Publication Data
US 2019/0381748 A1   Dec. 19, 2019

(30) Foreign Application Priority Data

Jun. 19, 2018 (JP) .............................. JP2018-115774

(51) Int. Cl.
| | |
|---|---|
| *B29C 65/00* | (2006.01) |
| *B29C 65/02* | (2006.01) |
| *B29L 31/00* | (2006.01) |

(52) U.S. Cl.
CPC ........ *B29C 66/52431* (2013.01); *B29C 65/02* (2013.01); *B29C 66/723* (2013.01); *B29L 2031/005* (2013.01)

(58) Field of Classification Search
CPC . B29C 66/52431; B29C 66/723; B29C 65/02; B29C 66/71; B29C 65/7451; B29C 65/7841; B29C 66/81427; B29C 66/326; B29C 65/745; B29C 65/20; B29C 66/73921; B29C 66/1162;

(Continued)

(56) References Cited

U.S. PATENT DOCUMENTS

| | | | |
|---|---|---|---|
| 4,239,574 A | 12/1980 | Aust et al. | |
| 5,902,447 A * | 5/1999 | Johnson | ............... B29C 66/1162 156/499 |
| 2006/0065358 A1* | 3/2006 | Cupp | ....................... B26D 1/09 156/304.6 |

FOREIGN PATENT DOCUMENTS

| | | |
|---|---|---|
| JP | S54-157970 U | 11/1979 |
| JP | H10-156948 A | 6/1998 |

(Continued)

OTHER PUBLICATIONS

Office Action, Japanese Patent Application No. 2018-115774, dated Dec. 7, 2021, 8 pages.

*Primary Examiner* — Michael N Orlando
*Assistant Examiner* — Christopher W Raimund
(74) *Attorney, Agent, or Firm* — Kilpatrick Townsend & Stockton LLP

(57) ABSTRACT

A manufacturing method of a resin frame includes preparing a plurality of frame members, installing a pair of the frame members in the corner portion in a pair of molds, melting end surfaces of the pair of the frame members as welding margins, and welding the welding margins. The molds respectively includes a reference surface holding the frame members and a blade portion protruding to an inner side with respect to the reference surface. In the welding, in the corner portion, the pair of the frame members are pressed by the blade portions, so that the welding margin protrudes from between the blade portions, the outer peripheral surfaces of the pair of the frame members are bent inward, and the corner portion is made concave with respect to the portions adjacent to the corner portion.

2 Claims, 8 Drawing Sheets

(58) Field of Classification Search
CPC ......... B29C 66/72523; B29L 2031/005; E06B 3/30; E06B 3/9604
See application file for complete search history.

(56) References Cited

FOREIGN PATENT DOCUMENTS

| | | | | |
|---|---|---|---|---|
| JP | 4926016 B2 * | 5/2012 | ....... | B29C 66/52431 |
| JP | 4926016 B2 | 5/2012 | | |

* cited by examiner

US 11,472,128 B2

MANUFACTURING METHOD OF RESIN FRAME

CROSS REFERENCE TO RELATED APPLICATIONS

This application is based on Japanese Patent Application (No. 2018-115774) filed on Jun. 19, 2018, the contents of which are incorporated herein by way of reference.

BACKGROUND ART

The present invention relates to a method of manufacturing a frame-shaped resin frame (a frame made from resin) including a corner portion when viewed from a front-rear direction, and the resin frame thereof. More specifically, the present invention relates to a resin frame manufacturing method, in which a plurality of resin frame members are used to form a resin frame that has a frame shape including a corner portion, and the resin frame thereof, the resin frame being manufactured through welding and integrating end surfaces of two frame members which are adjacent to each other in the corner portion.

There is an example of a method for joining two frame members, which includes: a melting process, in which end surfaces of the two frame members are heated, and end portions of the frame members are melted as welding margins; a welding process, in which the two frame members are held in a straight line, the welding margins of the two frame members are abutted against each other and welded; and a cutting process, in which outer peripheral portions of the welding margins which protrude on an outer surface side of the frame members (portions rising from an outer surface) during the abutting are cut by a blade portion (Patent Literature 1: Japanese Patent No. 4926016).

SUMMARY

A manufacturing method of a resin frame according to an aspect of the present invention is a method including:

a step of preparing, in which a plurality of frame members to be combined into a frame shape including a corner portion when viewed from a front-rear direction to form a resin frame, are prepared;

a step of installing, in which a pair of the frame members to be adjacent to each other in the corner portion are respectively installed in a pair of molds, the molds respectively including: a reference surface that holds one of the frame members from an outer peripheral surface of the respective frame members which is defined by viewing the frame members combined into the frame shape in the front-rear direction; and a blade portion that protrudes to an inner side with respect to the reference surface when viewed from the front-rear direction and holds a portion of an end portion of the one of the frame members from the outer peripheral surface;

a step of melting, in which end surfaces of the pair of the frame members, which are adjacent to each other in the corner portion, are heated and melted as welding margins; and a step of welding, in which the welding margins of the pair of the frame members are abutted against each other and welded, wherein in the welding process, in portions adjacent to the corner portion, the pair of the frame members are pressed by an adjacent pair of the reference surfaces of the pair of the molds, so that the end surfaces of the pair of the frame members are welded to each other, and in the corner portion, the pair of the frame members are pressed by a pair of the blade portions of the pair of the molds, so that the welding margin protrudes from between the pair of the blade portions, the outer peripheral surfaces of both of the pair of the frame members are bent inward when viewed in the front-rear direction, and the corner portion is made concave with respect to the portions adjacent to the corner portion.

Each of the frame members may include an inner layer and an outer layer.

A resin frame according to an aspect of the present invention is a resin frame including:

a plurality of frame members provided in a frame-shaped resin frame including a corner portion when viewed from a front-rear direction, wherein a pair of the frame members, which are adjacent to each other in the corner portion, are joined together through abutting end surfaces of the pair of the frame members against each other and welding in the corner portion, an outer peripheral surface of the corner portion of the pair of the frame members when viewed in the front-rear direction is a concave surface recessed on an inner side of the resin frame with respect to an extension line of outer peripheral surfaces of two portions adjacent to the corner portion in the pair of the frame members, and the concave surface includes a pair of the outer peripheral surfaces that are bent with respect to the outer peripheral surfaces of the two portions adjacent to the corner portion.

Each of the frame members may include an inner layer and an outer layer, and a pair of the outer layers may be bent from the two portions adjacent to the corner portion to the concave surface.

The inner layer may be provided between the pair of the outer layers on the concave surface.

BRIEF DESCRIPTION OF DRAWINGS

FIG. 2A shows a stage in which a frame member is placed in a lower mold, and FIG. 2B shows the mold in a closed state.

FIG. 3A is a plan view, and FIG. 3B is a cross-sectional view taken along Line A-A.

FIG. 4A is a plan view, and FIG. 4B is a cross-sectional view taken along Line B-B.

FIG. 5A is a plan view, and FIG. 5B is a cross-sectional view taken along Line C-C.

FIG. 7A is a plan view showing a state in which a heater is sandwiched, and FIG. 7B is a cross-sectional view showing a state in which end surfaces of frame members are welded.

DETAILED DESCRIPTION OF EXEMPLIFIED EMBODIMENT

Figure 7A:
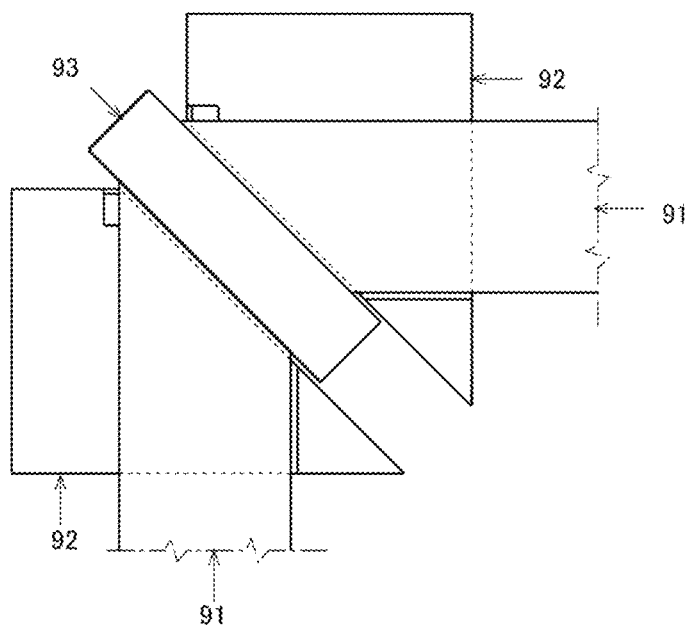
FIGS. 7A and 7B show an example in which a frame member joining method of prior art is applied to a resin frame manufacturing method.
Figure 7B:
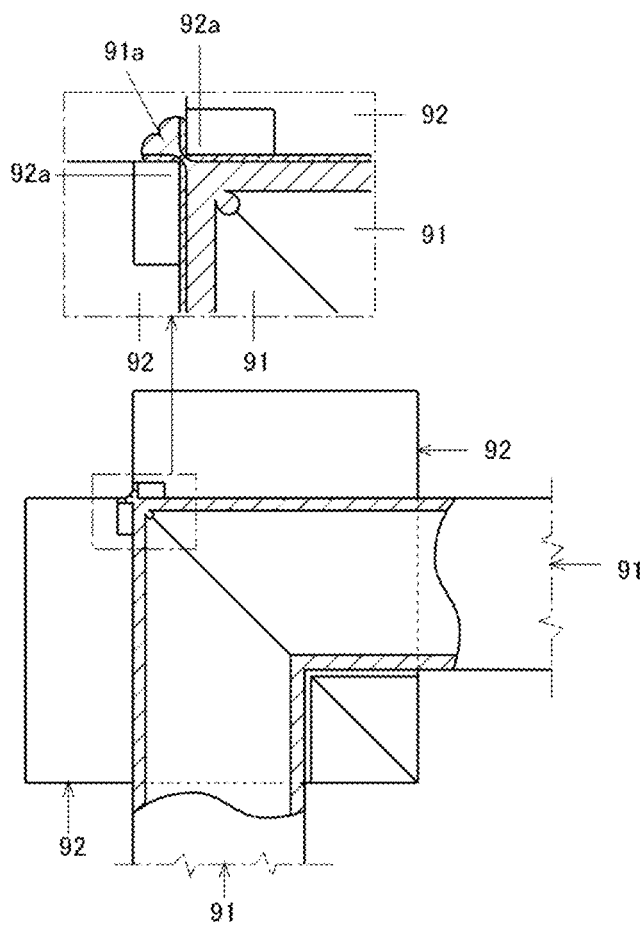
Figure 8:
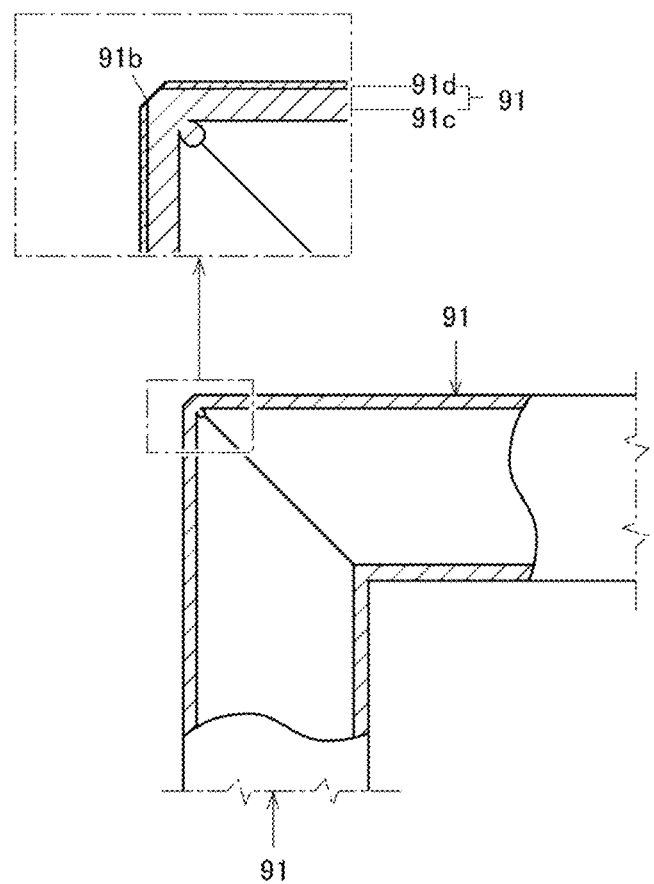
FIG. 8 is a cross-sectional view showing an example in which a corner portion of a resin frame is chamfered.

The joining method described in Patent Literature 1 is a method of abutting two frame members in a straight line. Such a joining direction is applied to, for example, a corner portion of a rectangular resin frame to manufacture the resin frame as follows. As shown in FIG. 7A, (1): End portions of a predetermined pair of frame members 91 which are adjacent to each other in a corner are installed in a pair of molds 92, respectively. In FIGS. 7A and 7B, only a lower mold of the molds 92 is shown, and the frame member 91 is placed in the lower mold. The frame member is a hollow polygonal cylinder. (2): The mold 92 is held in a direction orthogonal to each side of the rectangle of the resin frame, and a heater 93 is sandwiched between the pair of frame members 91 to melt end surfaces of the frame members 91 (the melting process). (3): The heater 93 is removed and the mold 92 is held again in the direction orthogonal to each side of the rectangle. The end surfaces of the pair of frame members 91 are abutted against each other to form the corner portion of the rectangle as shown in FIG. 7B, and the end surfaces of the pair of frame members 91 are welded with each other (the welding process). When the end surfaces of the pair of frame members 91 are abutted against each other, a portion 91a of a welding margin protrudes from the corner portion of the abutting to an outer peripheral side. In the mold 92, a portion corresponding to the corner portion of the rectangle becomes a blade portion 92a. When the pair of frame members 91 is welded, a pair of blade portions 92a, which are adjacent to each other in the corner portion of the rectangle, approaches each other. As a result of the approaching, the protruding portion 91a of the welding margin is cut (the cutting process). Thereafter, the corner portion is usually subjected to a machining process (a chamfering process), and a chamfered portion 91b is formed in the corner portion as shown in FIG. 8.

The frame member that forms the resin frame usually includes an inner layer 91c and an outer layer 91d made of different materials. When the chamfered portion 91b is formed in the corner portion as described above, the inner layer 91c is exposed in the chamfered portion 91b, which causes deterioration of appearance. In order to improve the appearance, although not shown in the figure, a surface of the inner layer 91c of the chamfered portion 91b is painted to form a decorative layer, and a color tone of the decorative layer is matched with the outer layer as much as possible. Since the chamfered portion is a surface recessed from an original outer peripheral surface of the frame member, the chamfered portion is hereinafter referred to as a concave surface regardless of whether the chamfering process is actually performed.

However, since the outer layer 91d of the frame member 91 in portions adjacent to the corner portion and the decorative layer of the concave surface 91b in the corner portion are different portions, the color tones of the two layers cannot be completely matched, thus the appearance of the resin frame is impaired. In addition, the chamfering and the painting increase the number of processes of forming the resin frame.

In addition, resin frames are not limited to include an inner layer and an outer layer. There are also single-layered resin frames. In this case, according to the joining method described above, since the concave surface in the corner portion is a machined surface, the outer peripheral surface of the frame member in the portion adjacent to the corner portion and the concave surface in the corner portion have a difference in surface roughness, thus the appearance (gloss) is slightly different. Therefore, in a case where the appearance of the outer peripheral surface of the frame member in the portion adjacent to the corner portion and the appearance of the concave surface in the corner portion are matched as much as possible, the concave surface is painted to form the decorative layer.

The present invention is made in view of the above circumstances, and an object of the present invention is to provide a resin frame that is formed in a frame shape including a corner portion when viewed in a front-rear direction, in which a concave surface is provided in the corner portion, and coincidence between appearance of an outer peripheral surface of a frame member in a portion adjacent to the corner portion and appearance of the corner portion (the concave surface) are optimized.

Figure 2A:
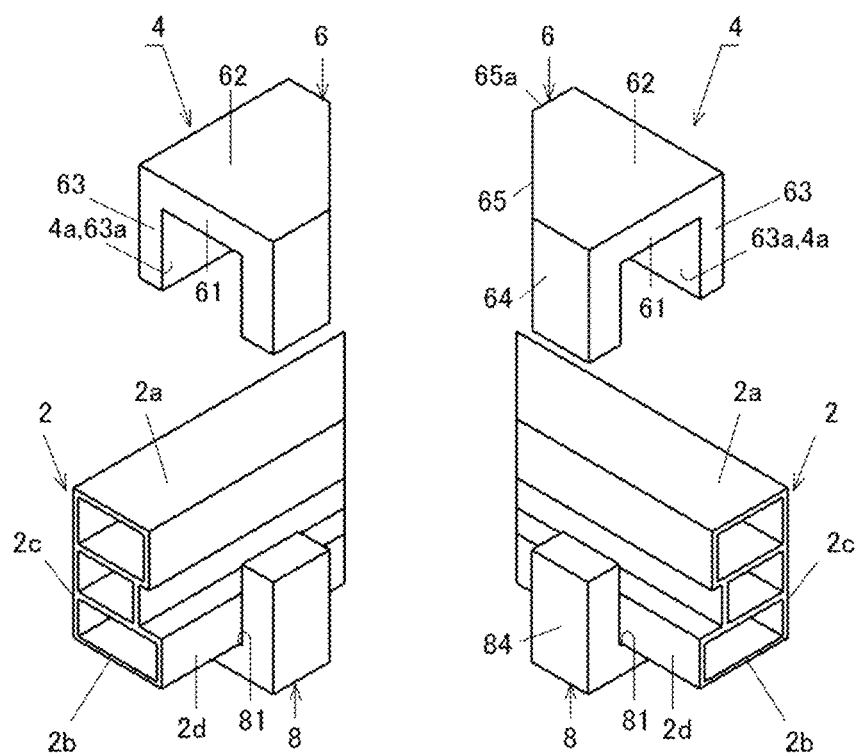
FIGS. 2A and 2B are perspective views showing a first portion of a working process according to the resin frame manufacturing method of the first embodiment.
Figure 2B:
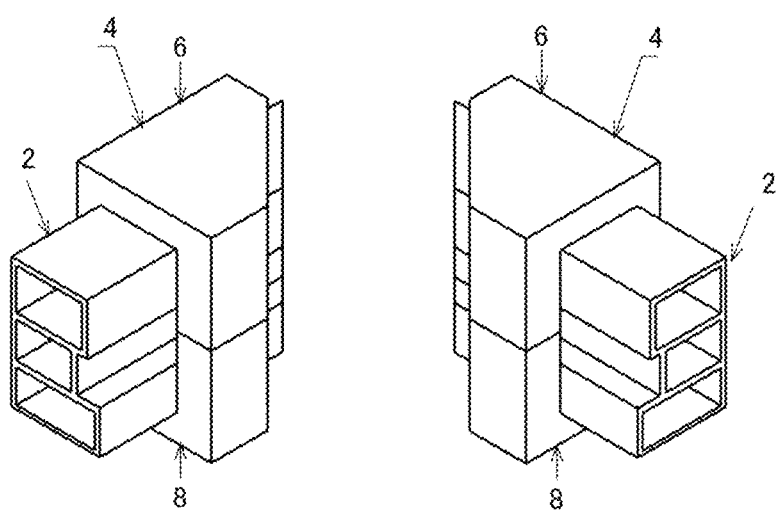

In a resin frame manufacturing method according to a first embodiment of the present invention, two frame members 2 are used to form a corner portion of a resin frame as shown in FIGS. 2A and 2B. Although not shown in the figure, as an example of a frame shape that includes a corner portion when viewed from a front-rear direction, the resin frame is formed in a rectangular shape in the present embodiment. A partition member that partitions front and rear portions of the resin frame when viewed from the front-rear direction is disposed inside the resin frame. In the present embodiment the partition member may be a fitting (door or sash) that is attached in a manner capable of being opened and closed with respect to the resin frame, and the partition member may also be a plate fixed to the resin frame 1, that is, fixed glass. In the present embodiment, it is assumed that the partition member is a sash (double sliding sash), and the resin frame is a window frame. More specifically, the resin frame of the present embodiment is a main portion of the window frame, and other members are fixed on an inner surface side of the resin frame. The resin frame and the other members are integrated to form a rectangular window frame.

The frame member 2 is made of resin and is hollow in the present embodiment. Four frame members 2 are combined into a rectangular shape with respective end surfaces abutting against each other. Therefore, when viewed from the front-rear direction, the end surface of the frame members 2 is inclined with respect to a direction in which the frame member 2 extends in a straight line (a longitudinal direction).

The direction is determined as follows with reference to a direction in which an outer shape of the resin frame is viewed.

Figure 3A:
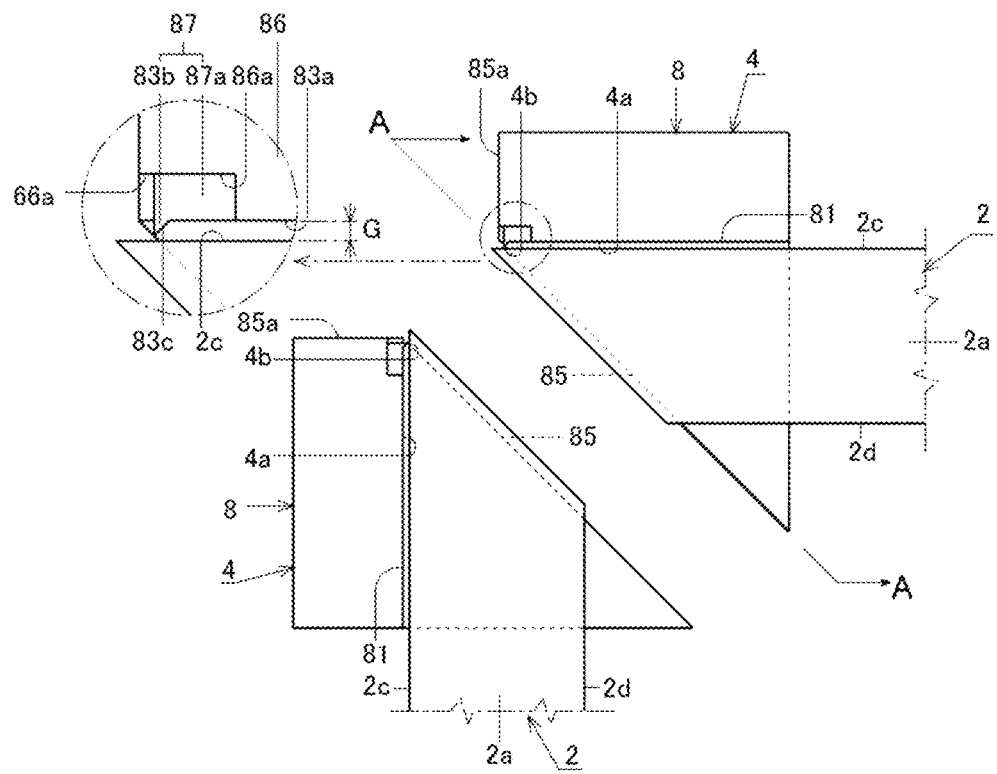
FIGS. 3A and 3B show the first portion of the working process according to the resin frame manufacturing method of the first embodiment.

The front-rear direction refers to a direction orthogonal to a page in FIG. 3A. A front direction refers to a direction facing a front side of the page in the direction orthogonal to the page. A rear direction refers to a direction facing a rear side of the page in the direction orthogonal to the page. An outer side refers to a direction facing outward with respect to the outer shape of the resin frame. An inner side refers to a direction facing inward with respect to the outer shape of the resin frame.

When viewed in the front-rear direction, the frame member 2 includes a front surface 2a, a rear surface 2b, an outer peripheral surface 2c, and an inner peripheral surface 2d. In the frame member 2 of the present embodiment, the front surface 2a, the rear surface 2b and the outer peripheral surface 2c are planar surfaces, while the inner peripheral surface 2d is an uneven surface.

Figure 1:
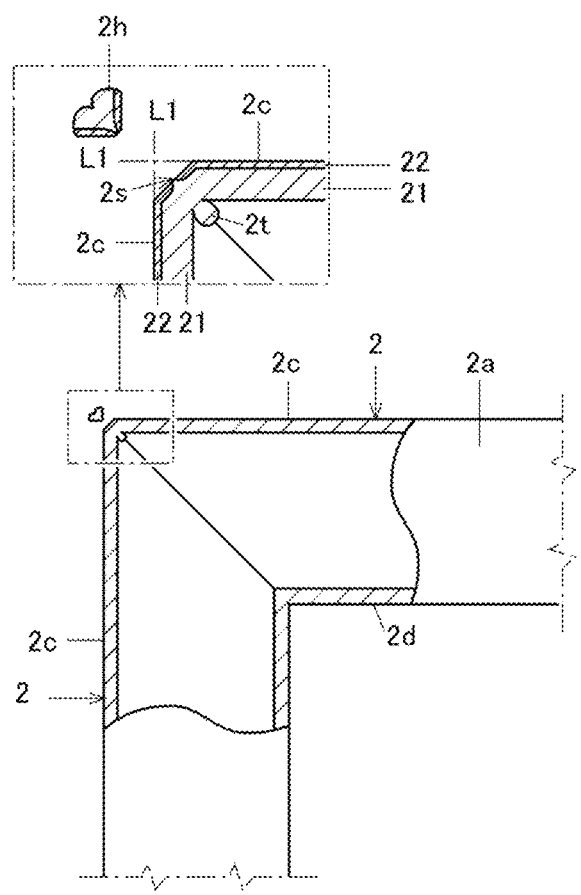
FIG. 1 is a cross-sectional view showing a portion of a resin frame manufactured by a resin frame manufacturing method according to a first embodiment of the present invention.

As shown in FIG. 1, the frame member 2 includes an inner layer 21 that forms an inner side of the frame member 2, and an outer layer 22 that forms an outer side of the frame member 2 and covers a surface of the inner layer 21, that is, a lamination structure. That is, the inner layer 21 and the outer layer 22 are overlapped and integrated. The inner layer 21 and the outer layer 22 are formed of different resin, and it is preferable that resin used in the outer layer 22 is harder than resin of the inner layer 21. For example, polyvinyl chloride (PVC) is used for the inner layer 21, and acrylic is used for the outer layer 22. The inner layer 21 is thicker than the outer layer 22.

In the resin frame manufacturing method according to the first embodiment of the present invention, a pair of molds 4, 4 is used in addition to the frame member 2 as shown in FIGS. 2A and 2B.

The molds 4 include a front mold 6 and a rear mold 8 that abut against each other in the front-rear direction. The front mold 6 and the rear mold 8 cooperate with each other to sandwich the frame member 2 from front and rear sides, and to hold the frame member 2 from outer sides when viewed in the front-rear direction. Since the front mold 6 and the rear mold 8 have a symmetrical structure in the front-rear direction, the following description will focus on the rear mold 8.

The rear mold 8 at least holds the rear surface 2b and the outer peripheral surface 2c with respect to a rear portion among end portions of the frame member 2 when viewed in the front-rear direction. In the present embodiment, the rear mold 8 has a U shape, which surrounds the rear surface 2b, the outer peripheral surface 2c, and the inner peripheral surface 2d with respect to the rear portion among the end portions of the frame member 2. The rear mold 8 has a block shape. The rear mold 8 includes: a groove portion 81 that extends straightly; a rear plate portion 82 which constitutes a surface of the groove portion 81 in a depth direction and covers the rear surface 2b of the frame member 2; an outer peripheral plate portion 83 which constitutes one of two surfaces of the groove portion 81 in a width direction and covers the outer peripheral surface 2c of the frame member 2; and an inner peripheral plate portion 84 which constitutes another surface of the two surfaces of the groove portion 81 in the width direction and covers the inner peripheral surface 2d of the frame member 2. The rear mold 8 includes end surfaces facing extending directions (two directions) of the groove portion 81. Among the end surfaces, in an end surface on the side of the corner portion, a portion corresponding to an overall lateral length of the groove portion 81 is inclined with respect to an extending direction of the groove portion 81 when viewed from the front-rear direction to form an inclined surface 85. A portion, which is located on an outer side than the portion corresponding to the overall lateral length of the groove portion 81 in the front-rear direction, is recessed toward an opposite end surface side from a surface obtained by extending the inclined surface 85 outward to form a concave surface 85a.

The outer peripheral plate portion 83 of the rear mold 8 includes a reference surface 83a which faces the outer peripheral surface 2c of the frame member 2. The reference surface 83a is a plane parallel to the extending direction of the groove portion 81. In the present embodiment, the reference surface 83a corresponds to a surface of the frame member 2 that will become the outer peripheral surface 2c of the resin frame, and is a planar surface parallel to the front-rear direction.

The rear mold 8 includes a blade portion 83b that protrudes inward with respect to the reference surface 83a when viewed in the front-rear direction and holds a portion of the end portion of the frame member 2. The blade portion 83b is formed on the side of the reference surface 83a of the rear mold 8 in the extending direction of the groove portion 81, and is provided with a surface 83c that intersects with the reference surface 83a at an obtuse angle. The blade portion 83b is formed over an entire length of the groove portion 81 in the depth direction (the front-rear direction).

In the present embodiment, the rear mold 8 includes a rear mold main body 86 where the groove portion 81 is formed, and a blade block 87 fixed to the side of the groove portion 81 of the rear mold main body 86. The rear mold main body 86 is provided with a step portion 86a which is recessed in a stepped shape with respect to the reference surface 83a on the side of the inclined surface 85 on the reference surface 83a of the outer peripheral plate portion 83. The blade block 87 includes a fixing portion 87a which is fixed to the step portion 86a of the rear mold main body 86 and the blade portion 83b which protrudes from the side of the reference surface 83a on the fixing portion 87a.

As described above, the front mold 6 forms a symmetrical structure with the rear mold 8 in the front-rear direction, so a detailed description thereof will be omitted.

The front mold 6 at least holds the front surface 2a and the outer peripheral surface 2c with respect to a front portion among the end portions of the frame member 2 when viewed in the front-rear direction. In the present embodiment, the front mold 6 surrounds the front surface 2a, the outer peripheral surface 2c, and the inner peripheral surface 2d with respect to the front portion among the end portions of the frame member 2. The front mold 6 includes a groove portion 61, a front plate portion 62, an outer peripheral plate portion 63, and an inner peripheral plate portion 64. The front mold 6 includes end surfaces facing extending directions (two directions) of the groove portion 61. Among the end surfaces, in an end surface on the side of the corner portion, a portion corresponding to an overall lateral length of the groove portion 61 is an inclined surface 65. A portion, which is located on an outer side than the portion corresponding to the overall lateral length of the groove portion 61 in the front-rear direction, is recessed toward an opposite end surface side from a surface obtained by extending the inclined surface 65 outward to form a concave surface 65a.

Figure 3B:
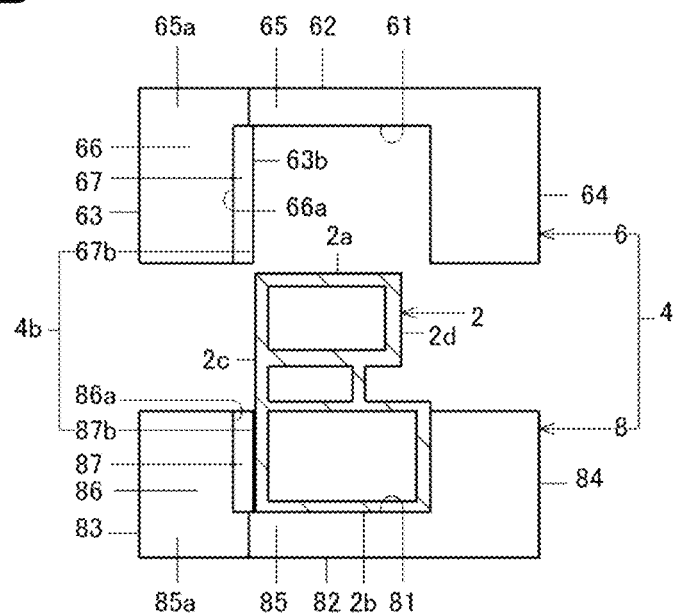

In the front mold 6, as shown in FIG. 2A, a surface of the outer peripheral plate portion 63 that faces the outer peripheral surface 2c of the frame member 2 is a reference surface 63a. As shown in FIG. 3B, the front mold 6 includes a blade portion 63b.

The front mold 6 includes a front mold main body 66 and a blade block 67. The front mold main body 66 includes a step portion 66a. The blade block 67 includes a fixing portion 67a and the blade portion 63b.

Therefore, the molds 4 are configured by the front mold 6 and the rear mold 8. A reference surface 4a that holds the outer peripheral surface 2c of the frame member 2 is formed by the reference surface 63a of the front mold 6 and the reference surface 83a of the rear mold 8. A blade portion 4b that holds a portion of the end portion of the frame member 2 from the side of the outer layer 22 is formed by the blade portion 63b of the front mold 6 and the blade portion 83b of the rear mold 8.

In FIG. 2B, the front mold 6 is disposed above the rear mold 8, the rear mold 8 is disposed below the front mold 6, and hereinafter, the front mold 6 may be referred to as an upper mold and the rear mold 8 may be referred to as a lower mold.

The resin frame manufacturing method according to the first embodiment of the present invention is as follows.

First, a preparing process is performed, in which the frame members 2 that form the resin frame are prepared. More specifically, the resin frame is formed by combining a plurality of frame members 2 in a rectangular shape, as an example of a frame shape including corner portions when viewed from the front-rear direction. A necessary number of frame members 2 are prepared to form such a resin frame.

Next, an installing process is performed, in which a predetermined pair of frame members 2, 2 which are adjacent to each other in the corner portion are separately provided in a pair of molds 4, 4. More specifically, (1) as shown in FIG. 2A and FIG. 3A, a lower portion (a rear portion) of the frame member 2 is fitted into the groove portion 81 of the lower mold 8. The end surface of the frame member 2 protrudes from the inclined surface 85 of the lower mold 8. At this time, since the blade portion 83b is provided as shown in FIG. 3A, a gap G is formed between the outer peripheral surface 2c of the frame member 2 and the reference surface 83a of the outer peripheral plate portion 83 of the lower mold 8. An upper portion (a front portion) of the frame member 2 protrudes upward with respect to the lower mold 8.

(2) Thereafter, as shown in FIG. 2B, the groove portion 61 of the upper mold 6 is fitted to an upper portion of the frame member 2 in the same manner as the groove portion 81 of the lower mold 8. In this way, the frame member 2 is sandwiched between the pair of molds 4, 4 and becomes unmovable in an up-down direction. Since the gap G is formed between the pair of molds 4, 4, the frame member is movable on an outer side in the gap G.

Figure 4A:
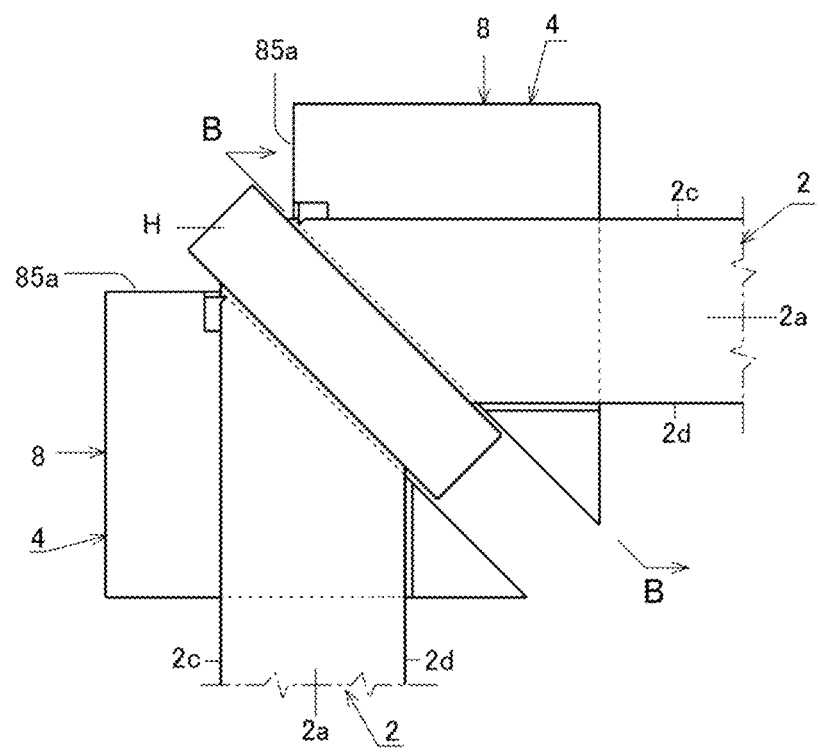
FIGS. 4A and 4B show a middle portion of the working process according to the resin frame manufacturing method of the first embodiment.
Figure 4B:
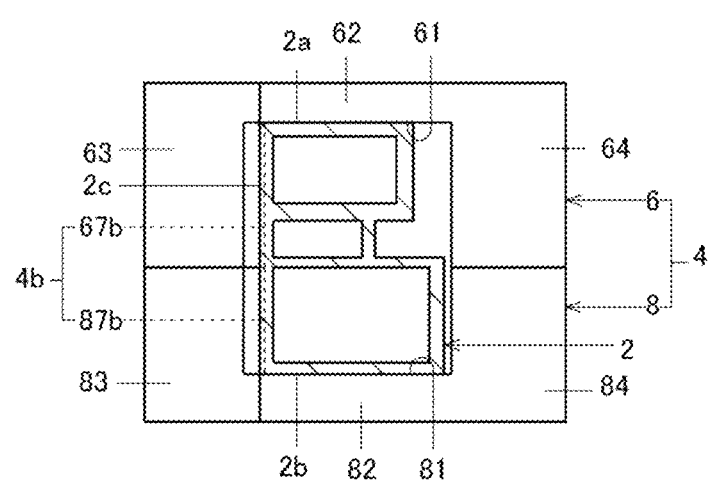

Next, a melting process is performed, in which end surfaces of the predetermined pair of frame members 2, 2, which are adjacent to each other in the corner portion, are heated and melted as welding margins. More specifically, as shown in FIG. 4A, the pair of molds 4, 4 is moved to press the end surfaces of the pair of frame members 2, 2 against a heated heater H. The single heater H is sandwiched and held between the end surfaces of the pair of frame members 2, 2, the end surfaces of the frame members 2 are melted by heat of the heater H, and the end surfaces of the pair of frame members 2, 2 come to a weldable state. The heat of the heater H is transmitted from the end surfaces of the frame members 2 to the vicinity thereof, and the vicinity of the end surfaces of the frame members 2 is softened and deformable. The softened portion including the end surfaces serves as the welding margin. Then, the pair of molds 4, 4 is moved, and the pair of frame members 2, 2 is separated from the heater H.

Figure 5A:
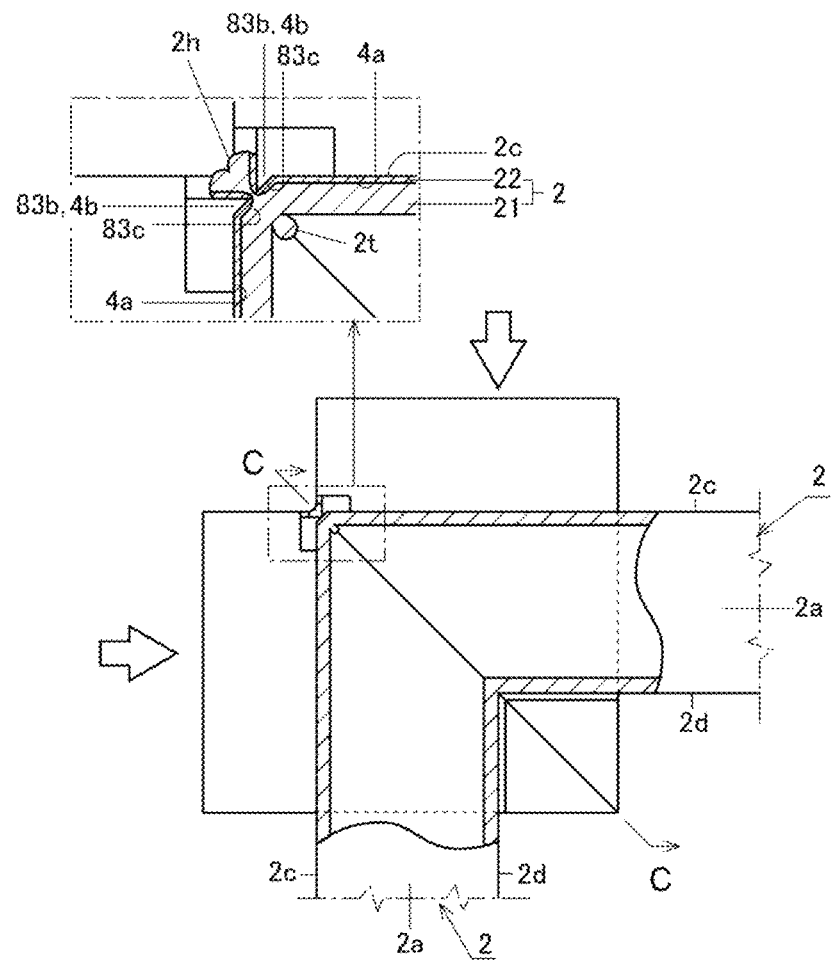
FIGS. 5A and 5B show a last portion of the working process according to the resin frame manufacturing method of the first embodiment.
Figure 5B:
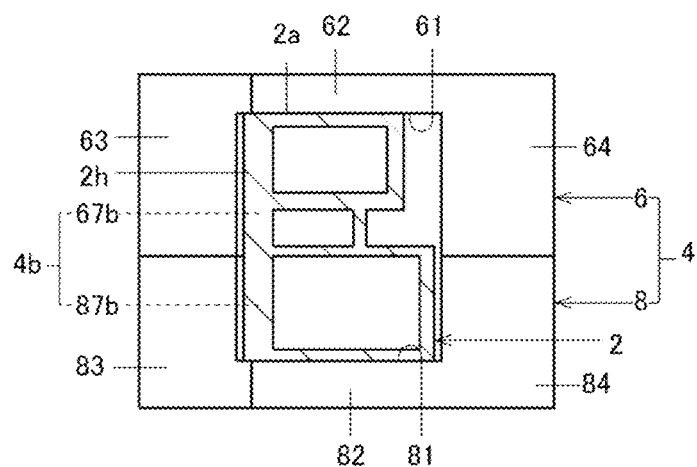

Next, a welding process is performed, in which the welding margins of the pair of frame members 2, 2 are abutted against each other and welded. More specifically, as shown in FIG. 5A, the pair of molds 4, 4 is moved, and the end surfaces of the pair of frame members 2, 2 (the end surfaces pressed against the heater H) are abutted against each other. In portions adjacent to the corner portion of the resin frame, the outer peripheral surfaces 2c of the pair of frame members 2, 2 are pressed by a pair of adjacent reference surfaces 4a of the pair of molds 4, 4. As a result, the end surfaces of the pair of frame members 2 are welded to each other in the inner layer 21 and are thus joined. In the corner portion of the resin frame, as shown in FIG. 5A, the outer peripheral surfaces 2c of the pair of frame members 2, 2 are pressed by a pair of blade portions 4b, 4b of the pair of molds 4, 4, so that a portion 2h of the welding margin protrudes from between the pair of pressing blade portions 4b, 4b. During this pressing, a gap between the pair of blade portions 4b, 4b is narrowed, and the protruding portion 2h of the welding margin is cut as shown in FIG. 1. Even in a state where the protruding portion 2h of the welding margin is attached to the pair of frame members 2, 2 at a moment when the pair of blade portions 4b, 4b is closest to each other, when an impact is applied to the protruding portion 2h of the welding margin, the protruding portion 2h of the welding margin is separated from the pair of frame members 2, 2. Cutting means to separate the protruding welding margin from the pair of frame members 2, and includes cases of the above separation. Since the welding margin is softened, during the pressing, the pair of blade portions 4b, 4b bends a portion of the outer peripheral surfaces 2c of the end portions of the pair of frame members 2, 2 inward when viewed from the front-rear direction, and the corner portion becomes a concave surface 2s with respect to the portions adjacent to the corner portion.

The concave surface 2s is a surface recessed inward when viewed in the front-rear direction with respect to the outer peripheral surfaces 2c of the portions of the frame members 2 which are adjacent to the corner portion. More specifically, the outer peripheral surfaces 2c of the portions adjacent to the corner portion on the outer surfaces of the frame members 2 are straight lines when viewed from the front-rear direction in the drawing. Extension lines L1 are drawn from the outer peripheral surfaces 2c (the straight lines) of the pair of adjacent frame members 2 and intersects with each other as indicated by chain lines in the drawing. The concave surface 2s is recessed inward from a pair of intersected extension lines L1.

The concave surface 2s is provided with the outer layers 22 on both sides of the frame member 2 in the circumferential direction when viewed in the front-rear direction, and the inner layer 21 is provided between a pair of outer layers 22, 22. The pair of outer layers 22, 22 of the concave surface 2s (the corner portion) is bent inward with respect to the outer layers 22 of two portions adjacent to the corner portion.

A portion 2t of the welding margin protrudes on a side opposite to the concave surface 2s, that is, on the side of the inner layers 21, 21 of the pair of adjacent frame members 2, 2.

In the resin frame manufacturing method of the first embodiment described above, the concave surface 2s is formed in the corner portion of the resin frame by the welding process without performing the chamfering process. The concave surface 2s is formed in the corner portion of the resin frame manufactured by this manufacturing method, and the outer layers 22 of the pair of frame members 2, 2 are provided on the concave surface 22. Therefore, the outer portions 22 of the portions adjacent to the corner portion and the outer layer 22 of the corner portion have the same color tone.

Figure 6:
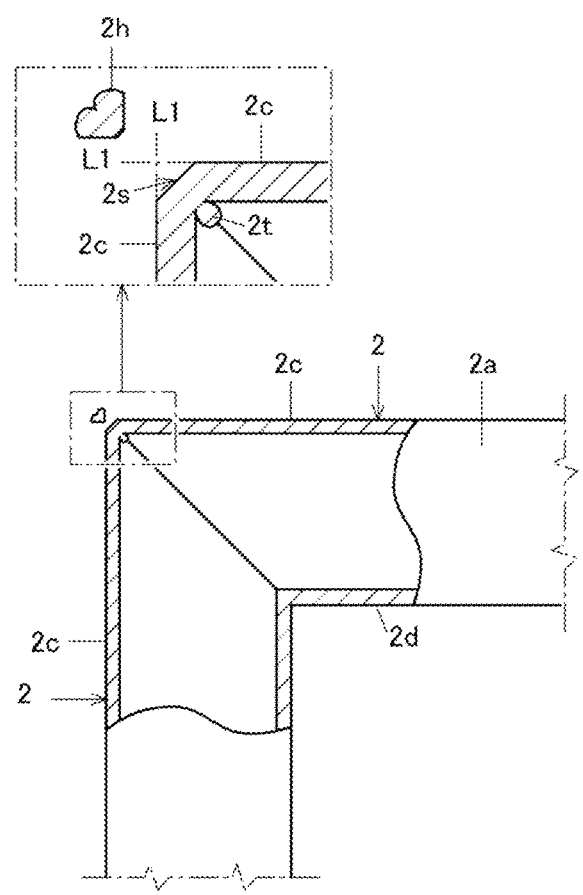
FIG. 6 is a cross-sectional view showing a portion of another resin frame manufactured by the resin frame manufacturing method according to the first embodiment of the present invention.

In the resin frame manufacturing method of the first embodiment described above, the frame member 2 used includes the inner layer 21 and the outer layer 22 made of different resin, but a single-layered frame member made of a single type of resin may also be used. Even in this case, the concave surface 2s is formed by the welding process as shown in FIG. 6 without performing the chamfering process. The concave surface 2s is recessed inward from the extension lines L1 drawn from the outer peripheral surfaces 2c (the straight lines) of the pair of adjacent frame members 2, 2. Appearance of the outer peripheral surfaces 2c of the portions adjacent to the corner portion and appearance of the outer peripheral surfaces of the corner portion (the concave surface 2s) coincide with each other better than the case where the corner portion (the concave surface) is formed by cutting.

The present invention is not limited to the above-described embodiment, and modifications can be made without departing from the scope thereof.

For example, in the present embodiment, the plurality of frame members 2 constituting the resin frame have the same shape, and the end surfaces of the pair of frame members 2, 2, which are adjacent to each other in the corner portion of the rectangle, are abutted against each other, but the present invention is not limited thereto, and the end surfaces may have different shapes. In this case, in the the pair of frame members adjacent to each other in the corner portion of the rectangle, portions of end surfaces which are abutted against each other may have the same shape.

The outer shape of the resin frame is rectangular in the present embodiment, but the present invention is not limited thereto, and the resin frame may have a triangular shape or have a polygonal shape including five or more corners, or have a frame shape including at least one corner portion.

In the present invention, the term "forming a resin frame by combining a frame shape that includes a corner portion when viewed from the front-rear direction" means that the resin frame is formed in a manner that the outer shape of the resin frame viewed from the front-rear direction is a frame shape including a corner portion. In the present invention, the term "a pair of frame members adjacent to each other in a corner portion" is limited to a case where the number of frame members present at the corner portion is two. In other words, the "pair of frame members adjacent to each other in the corner portion" is, for example, two frame members extending along two adjacent sides of a polygon if the outer shape of the resin frame is polygonal. The two frame members include a joint portion where end surfaces of the two frame members are abutted against each other and joined.

Meanwhile, when the number of frame members present in the corner portion is three, the frame members does not coincide with the pair of frame members adjacent to each other in the corner portion in the present invention. For example, a case where the number of frame members present in the corner portion is three includes: two frame members extending in a direction away from the vicinity of a corner portion of a polygon, and extending along two adjacent sides from the vicinity of the corner; and one frame member extending from the corner portion in a manner that partitions the two adjacent sides.

In view of the above, embodiments according to the present application are briefly explained as below.

A resin frame manufacturing method of the present invention includes a preparing process, in which a plurality of frame members, which are combined into a frame shape including a corner portion when viewed from a front-rear direction to form a resin frame, are prepared. The resin frame manufacturing method of the present invention further includes an installing process, in which a mold is used, and a predetermined pair of frame members, which are adjacent to each other in the corner portion among the plurality of the frame members, is installed separately in a pair of molds. The mold includes a reference surface that holds the frame member from an outer peripheral surface of the frame member when the frame member is combined into the frame shape when viewed in the front-rear direction and a blade portion that protrudes to an inner side with respect to the reference surface when viewed from the front-rear direction and presses a portion of an end portion of the frame member from the outer peripheral surface. The resin frame manufacturing method of the present invention further includes a melting process, in which end surfaces of the pair of frame members, which are adjacent to each other in the corner portion among the plurality of frame members, are heated and melted as welding margins. A resin frame manufacturing method of the present invention further includes a welding process, in which the welding margins of the pair of frame members are abutted against each other and welded. In the welding process, in portions adjacent to the corner portion, the pair of frame members is pressed by an adjacent pair of reference surfaces of the pair of molds, so that the end surfaces of the pair of frame members are welded to each other. In the corner portion, the pair of frame members is pressed by a pair of blade portions of the pair of molds, so that the welding margin protrudes from between the pair of blade portions and is cut off. The outer peripheral surfaces of both of the pair of frame members are bent inward when viewed in the front-rear direction, and the corner portion is made concave with respect to the portions adjacent to the corner portion.

In the resin frame manufacturing method of the present invention, it does not matter whether the frame member is single-layered or not. However, a bent corner portion, which is a concave surface, makes more sense in the following case than in the case where the frame member is single-layered.

That is, the frame member includes an inner layer and an outer layer.

The resin frame of the present invention includes a plurality of frame members that constitute a frame-shaped resin frame including a corner portion when viewed from a front-rear direction. A pair of frame members, which is adjacent to each other in the corner portion, is joined together through abutting end surfaces of the pair of frame members against each other and welding in the corner portion. An outer peripheral surface of the corner portion of the pair of frame members when viewed in the front-rear direction is a concave surface recessed on an inner side of the resin frame with respect to an extension line of outer peripheral surfaces of two portions adjacent to the corner portion in the pair of frame members. The concave surface includes a pair of outer peripheral surfaces that are bent with respect to the outer peripheral surfaces of the two portions adjacent to the corner portion. The term "bent" means to be actually bent, excluding a case where cutting is performed to make a shape seemingly bent. Whether the shape is actually bent or seemingly bent by cutting can be determined, for example, by measuring surface roughness.

Although it does not matter whether the frame member is single-layered or not, the bent corner portion which is the concave surface makes more sense in the following case than in the case where the frame member is single-layered.

That is, the frame member includes the inner layer and the outer layer. The concave surface includes a pair of outer layers that are bent with respect to the outer layers of the two portions adjacent to the corner portion.

The concave surface includes the pair of outer layers in the corner portion on both sides in a circumferential direction of the resin frame when viewed from the front-rear direction. It does not matter whether another layer is provided between the pair of outer layers. For example, the concave surface may include a decorative layer, which is different from the outer layer and the inner layer, between the pair of outer layers. However, when the corner portion of the resin frame is manufactured according to the resin frame manufacturing method of the present invention, the concave surface includes an inner layer between the pair of outer layers.

In the resin frame manufacturing method of the present invention, the concave surface is formed by the welding process without performing the chamfering process.

According to the resin frame manufacturing method and the resin frame of the present invention, since the concave surface is formed in the corner portion of the resin frame while the outer peripheral surfaces of the pair of frame members are bent and provided on the concave surface, appearance of the outer peripheral surfaces of the portions adjacent to the corner portion and appearance of the outer peripheral surfaces of the corner portion (the concave surface) coincide with each other better than the case where the corner portion (the concave surface) is formed by cutting.

According to the resin frame manufacturing method and the resin frame of the present invention, if the frame member includes inner layers and outer layers, since the outer layers of the pair of frame members are provided on the concave surface, the outer layers of the portions adjacent to the corner portion and the outer layers of the corner portion have the same color tone.

What is claimed is:

1. A manufacturing method of a resin frame, the method comprising:
   a step of preparing, in which a plurality of frame members to be combined into a frame shape including a corner portion when viewed from a front-rear direction to form a resin frame, are prepared;
   a step of installing, in which a pair of the frame members to be adjacent to each other in the corner portion are respectively installed in a pair of molds, the molds respectively including: a reference surface that holds one of the frame members from an outer peripheral surface of the respective frame members which is defined by viewing the frame members combined into the frame shape in the front-rear direction so that an end surface of the respective frame member protrudes beyond an inclined surface of the mold; and a blade portion that protrudes to an inner side with respect to the reference surface when viewed from the front-rear direction and contacts a portion of an end portion of the one of the frame members from the outer peripheral surface, wherein the blade portion is provided with a surface that intersects with the reference surface at an obtuse angle, and a gap is formed between the blade portion, the reference surface, and the outer peripheral surface of the frame member, wherein each of the molds is provided with a step portion which is recessed in a stepped shape with respect to the reference surface on a side of the inclined surface on the reference surface, and a blade block including the blade portion is fixed to the step portion;
   a step of melting, in which end surfaces of the pair of the frame members, which are adjacent to each other in the corner portion, are heated and melted as welding margins; and
   a step of welding, in which the welding margins of the pair of the frame members are abutted against each other and welded, wherein
   in the step of installing, each of the molds includes a front mold and a rear mold that abut against each other in the front-rear direction such that the front mold and the rear mold cooperate with each other to sandwich the respective frame member from front and rear sides and to hold the respective frame member from outer sides when viewed in the front-rear direction, and the front mold and the rear mold have a symmetrical structure in the front-rear direction, and
   in the welding step,
      in portions adjacent to the corner portion, the pair of the frame members are pressed by an adjacent pair of the reference surfaces of the pair of the molds, so that the end surfaces of the pair of the frame members are welded to each other, and
      in the corner portion, the pair of the frame members are pressed by a pair of the blade portions of the pair of the molds, so that the welding margin protrudes from between the pair of the blade portions, the outer peripheral surfaces of both of the pair of the frame members are bent inward when viewed in the front-rear direction, and the corner portion is made concave with respect to the portions adjacent to the corner portion.

2. The resin frame manufacturing method according to claim 1, wherein
   each of the frame members includes an inner layer and an outer layer.

* * * * *